United States Patent
Hillstroem et al.

(10) Patent No.: US 9,227,677 B2
(45) Date of Patent: Jan. 5, 2016

(54) MOTOR VEHICLE WITH AN UNDERBODY TRIM

(71) Applicant: Bayerische Motoren Werke Aktiengesellschaft, Munich (DE)

(72) Inventors: Mats Stefan Hillstroem, Shenyang/Dongling District (CN); Ioannis Dimitriou, Marzling (DE); Jochen Mayer, Freising (DE); Stefan Meszaros, Munich (DE); Christian Seitz, Unterfoehring (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 14/506,077

(22) Filed: Oct. 3, 2014

(65) Prior Publication Data
US 2015/0021111 A1    Jan. 22, 2015

Related U.S. Application Data

(63) Continuation of application No. PCT/EP2013/056271, filed on Mar. 25, 2013.

(30) Foreign Application Priority Data

Apr. 4, 2012  (DE) .......................... 10 2012 205 582

(51) Int. Cl.
*B62D 35/02* (2006.01)
*B60K 13/04* (2006.01)
(Continued)

(52) U.S. Cl.
CPC ................ *B62D 35/02* (2013.01); *B60K 13/04* (2013.01); *B62D 37/02* (2013.01); *F01N 3/055* (2013.01); *F01N 2260/022* (2013.01); *Y02T 10/20* (2013.01)

(58) Field of Classification Search
CPC ......... B62D 35/02; B60K 13/04; F01N 3/055
USPC ................ 180/346, 89.2; 280/762; 296/180.1
See application file for complete search history.

(56) References Cited

U.S. PATENT DOCUMENTS 3,863,445 A * 2/1975 Heath ............................ 60/299
5,042,870 A * 8/1991 Yura .......................... 296/180.1
(Continued)

FOREIGN PATENT DOCUMENTS

DE         43 19 281 A1     12/1994
DE         199 61 316 A1     6/2001
(Continued)

OTHER PUBLICATIONS

International Search Report (PCT/ISA/210) dated May 8, 2013, with English translation (Seven (7) pages).
(Continued)

*Primary Examiner* — Paul N Dickson
*Assistant Examiner* — Darlene P Condra
(74) *Attorney, Agent, or Firm* — Crowell & Moring LLP

(57) ABSTRACT

An underbody trim for the rear-end region of a motor vehicle conceals a rear exhaust muffler. For the purposes of cooling the rear exhaust muffler, an air inlet is provided in the underbody trim. The air inlet is arranged in a region in which, while the motor vehicle is traveling, a pressure is higher at the underside of the underbody trim than the region of the floor panel arranged thereabove. Cooling ambient air is thus conducted into the region of the rear exhaust muffler with low flow losses.

11 Claims, 3 Drawing Sheets

(51) Int. Cl.
*B62D 37/02* (2006.01)
*F01N 3/05* (2006.01)

(56) References Cited

U.S. PATENT DOCUMENTS

| | | | |
|---|---|---|---|
| 5,464,952 A * | 11/1995 | Shah et al. | 181/211 |
| 5,813,491 A * | 9/1998 | Sato et al. | 180/309 |
| 6,435,298 B1 * | 8/2002 | Mizuno et al. | 180/346 |
| 2007/0240932 A1* | 10/2007 | Van De Flier et al. | 181/228 |
| 2008/0136217 A1* | 6/2008 | De Ciutiis | 296/204 |
| 2011/0095563 A1* | 4/2011 | Andersen | 296/180.1 |
| 2011/0309652 A1* | 12/2011 | Eichentopf et al. | 296/180.1 |
| 2013/0026797 A1* | 1/2013 | Onodera et al. | 296/204 |
| 2013/0200656 A1* | 8/2013 | Shimmell et al. | 296/204 |

FOREIGN PATENT DOCUMENTS

| | | |
|---|---|---|
| DE | 699 05 842 T2 | 10/2003 |
| DE | 10 2004 030 211 B3 | 11/2005 |
| DE | 10 2008 024 786 A1 | 11/2009 |
| EP | 1 013 540 A2 | 6/2000 |
| EP | 1 609 706 A2 | 12/2005 |
| JP | 3-576 A | 1/1991 |
| JP | 7-215074 A | 8/1995 |

OTHER PUBLICATIONS

German Search Report dated Dec. 18, 2012, with English translation (Ten (10) pages).

* cited by examiner

MOTOR VEHICLE WITH AN UNDERBODY TRIM

CROSS REFERENCE TO RELATED APPLICATIONS

This application is a continuation of PCT International Application No. PCT/EP2013/056271, filed Mar. 25, 2013, which claims priority under 35 U.S.C. §119 from German Patent Application No. 10 2012 205 582.7, filed Apr. 4, 2012, the entire disclosures of which are herein expressly incorporated by reference.

BACKGROUND AND SUMMARY OF THE INVENTION

The invention relates to a motor vehicle having an underbody trim in the rear-end region of the motor vehicle, wherein the underbody trim is arranged below a floor panel of the motor vehicle and at least partially conceals a rear exhaust muffler.

A motor vehicle known, for example, from DE 43 19 281 A1 has a plate-like trim part below the floor panel. The trim part is provided with a multiplicity of air inlets. In this way, a boundary layer region, in which there is a risk of turbulence, at that side of the reinforcement part which faces toward the air flow while the motor vehicle is traveling is drawn away in the direction of the floor panel. The remaining part of the air at the flow-exposed side of the reinforcement part thus flows along the underbody trim in a laminar fashion, resulting in a lower air resistance. The known underbody trim also extends in the rear region of the motor vehicle and, here, conceals for example a fuel tank and a rear exhaust muffler.

It is an object of the invention to further develop the underbody trim of the known motor vehicle, in particular to obtain effective cooling of a rear exhaust muffler, without increasing the air resistance coefficient of the motor vehicle in the process.

This and other objects are achieved according to the invention by a motor vehicle having an underbody trim in the rear-end region of the motor vehicle, wherein the underbody trim is arranged below a floor panel of the motor vehicle and at least partially conceals a rear exhaust muffler. At least one air inlet is provided in the underbody trim, wherein the air inlet is provided in the region of the rear exhaust muffler, exclusively in a region in which, while the motor vehicle is traveling, a pressure is higher at the underside of the underbody trim than in an intermediate space between the underbody trim and the floor panel.

The core concept of the invention is that of providing the underbody trim with at least one air inlet in the region of the rear exhaust muffler, wherein the air inlet is arranged exclusively in a region in which, while the motor vehicle is traveling, a pressure is higher at the underside of the underbody trim panel than in the region of the floor panel situated thereabove. With an air inlet located in this way, it is achieved that the air flowing along the underbody trim flows into the air inlet solely on account of the pressure conditions between the outer side and the inner side of the underbody trim. In this way, a flow of ambient air into the intermediate space between the underbody trim and the floor panel is achieved with particularly low resistance, such that an adequate amount of cooling air is available for this region, which region is subjected to thermal load by the rear exhaust muffler. Owing to the fact that the cooling air flows in with low resistance, the air resistance coefficient of the motor vehicle is not increased, or is even reduced, in relation to a motor vehicle without the air inlet, such that in this way, despite improved thermal operational reliability of the motor vehicle, the fuel consumption thereof remains unchanged or is even lowered.

By performing pressure measurements in the rear-end region of motor vehicles, with a multiplicity of measurements at measurement points spaced apart from one another in the longitudinal direction of the motor vehicle, it is possible to localize a threshold point or a line of threshold points running approximately in the transverse direction of the motor vehicle. At said threshold point, or at said threshold points, the negative pressure at the underside of the underbody trim and the negative pressure in the intermediate space between underbody trim and floor panel are equal. As already explained above, while the motor vehicle is traveling, in the region behind said threshold point or behind said threshold points, it is possible for a fraction of the underbody flow to flow of its own accord into the intermediate space between underbody trim and floor panel owing to the pressure conditions. According to the invention, the air inlet is arranged, in a targeted fashion, in the region behind the threshold point or behind the line of threshold points.

The region that is subject to thermal load is primarily the surroundings of the rear exhaust muffler that is concealed by the underbody trim. The underbody trim prevents the thermal energy in this region from being able to escape by convection or radiation. As a result, without additional measures, there would be an inadmissibly high temperature in the surroundings of the rear exhaust muffler, and of the floor panel arranged above the rear exhaust muffler and possibly of components arranged above the floor panel in the luggage compartment. It is often the case that electrical and electronic components such as, for example, a starter battery or a control unit are arranged in the lower region of the luggage compartment. Furthermore, components of chassis control systems are often also situated in the surroundings of the rear exhaust muffler.

As a result of the introduction, according to the invention, of cooling air with low resistance into regions subject to relatively high thermal load (so-called "hotspots"), the thermal operational reliability of the motor vehicle is improved. By means of an air inlet according to the invention, the temperature at the floor panel of the motor vehicle can be minimized. The invention can be used in all variants of motor vehicles, regardless of the drive, engine and/or bodyshell concept. The phenomenon of the pressure being higher in a particular region under the underbody trim than in the intermediate space, situated thereabove, between the underbody trim and floor panel arises even at low speeds, and is intensified with increasing speed of the motor vehicle, such that the invention is highly effective in many operating states of the motor vehicle.

The at least one air inlet may be designed in any desired way, for example as a classic ramp, as a large NACA inlet, in the form of multiple small NACA inlets, etc. If multiple inlets are provided, these are arranged adjacent to one another as viewed in the direction of travel, that is to say arranged in the transverse direction of the motor vehicle, at least approximately in a row.

In one advantageous refinement of the invention, the underbody trim is formed in the manner of a diffuser, with a level of the underbody trim rising in the vertical direction of the motor vehicle counter to the direction of travel. Owing to the fact that the spacing between the underside of the underbody trim and the roadway increases toward the rear-end region of the motor vehicle, the pressure at the underside of the underbody trim increases continuously, or in other words the negative pressure at the underbody trim decreases, in the direction of the rear end of the vehicle during forward travel of the motor vehicle. Furthermore, the design of the underbody trim as a diffuser has an advantageous effect on the left of the motor vehicle, and thus on the driving characteristics of the motor vehicle.

The invention can be realized in two basic embodiments depending on the structural height of the rear exhaust muffler.

In the case of motor vehicles with a rear exhaust muffler which, owing to its structural height, is situated in the intermediate space between the floor panel and the underbody trim, and which can thus be completely concealed by the underbody trim, the air inlet is formed exclusively by a cutout in the underbody trim. Said cutout is, as viewed in the vertical direction of the motor vehicle, arranged below the underside of the rear exhaust muffler. Here, the position term "below" relates to the vertical direction of the motor vehicle and does not exclude an offset in the longitudinal direction of the motor vehicle.

In the case of motor vehicles with a rear exhaust muffler which, owing to its structural height, cannot be completely concealed by underbody trim, the underbody trim has a cutout which is larger than the air inlet. It is thus possible for the underside of the rear exhaust muffler to project through the cutout in the underbody trim, that is to say the underside of the rear exhaust muffler protrudes downward beyond the contour of the underbody trim. Here, the front edge of the cutout adjoins the front side of the rear exhaust muffler, which protrudes downwardly in the direction of the roadway, with the smallest possible gap. This region is designed such that the air flowing along the underbody flows over the gap with the least possible losses. By contrast, at the rear side of the rear exhaust muffler, a relatively large gap is intentionally provided between the rear exhaust muffler and the rear edge of the cutout. This gap constitutes the air inlet, that is to say the rear exhaust muffler forms the air inlet in interaction with the cutout in the underbody trim.

The invention can advantageously be used in motor vehicles which have a rear exhaust muffler arranged transversely with respect to the direction of travel. The invention can, however, basically also be used in motor vehicles which have a rear exhaust muffler arranged obliquely with respect to the direction of travel or in the direction of travel.

In a preferred refinement of the invention, the air inlet is arranged behind the rear exhaust muffler as viewed in the longitudinal direction of the motor vehicle. It is achieved in this way that the air flows into the intermediate space between the floor panel and the underbody trim behind the rear exhaust muffler and, after being diverted into the direction of travel, can flow around the entire rear exhaust muffler.

In a further refinement of the invention, at least one air-guiding panel is provided by which the air that flows upward in the direction of the floor panel from the underbody flow is guided around the rear exhaust muffler. The air-guiding panel can interact with a heat shield panel, which shields the heat radiation from the rear exhaust muffler, by virtue of said heat shield panel additionally performing air-guiding tasks. It is likewise possible for the air-guiding panel to perform the function of a heat shield panel. The combination of air-guiding panel and heat shield plate thus ensures an effective flow of cooling ambient air around the rear exhaust muffler and, if appropriate, adjacent regions.

The underbody trim according to the invention covers as large a part of the underbody of the motor vehicle as possible in order that flow passes around the latter with low flow losses. In a first embodiment of the invention, the underbody trim begins directly after the rear axle and extends as far as the trim of the rear bumper. Here, the underbody trim adjoins the trim of the rear bumper, and adjacent components if appropriate, in an aerodynamically expedient manner, as far as possible without steps and joints. In a second embodiment of the invention, the underbody trim even begins in front of the rear axle and thus additionally covers the region of the rear axle, resulting in further improved aerodynamic effectiveness which results firstly from the optimized flow over the rear axle and secondly from the greater "approach" provided for the flow for a uniform flow around the rear-end region of the motor vehicle.

As well as concealing the rear exhaust muffler and, if appropriate, the region of the rear axle, the underbody trim also conceals a section of greater or lesser length of the pipeline, which leads to the rear exhaust muffler, of the exhaust system of the motor vehicle. The fuel tank of the motor vehicle is advantageously also concealed by the underbody trim.

The underbody trim is mounted on the motor vehicle by means of conventional connecting technologies such as screws, clips, welding, adhesive bonding, etc. The material of the underbody trim should be selected in accordance with the specific requirements (strengths, stiffness, heat resistance, flexibility, etc.). The underbody trim will be provided in part, or over the full area, with reinforcements, coatings and the like in accordance with the prevailing loads.

The position terms "front", "rear", "top", "bottom", "inside", "outside", etc. used in conjunction with the present invention relate to the installation position of the respective components in the motor vehicle during forward travel.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 4:
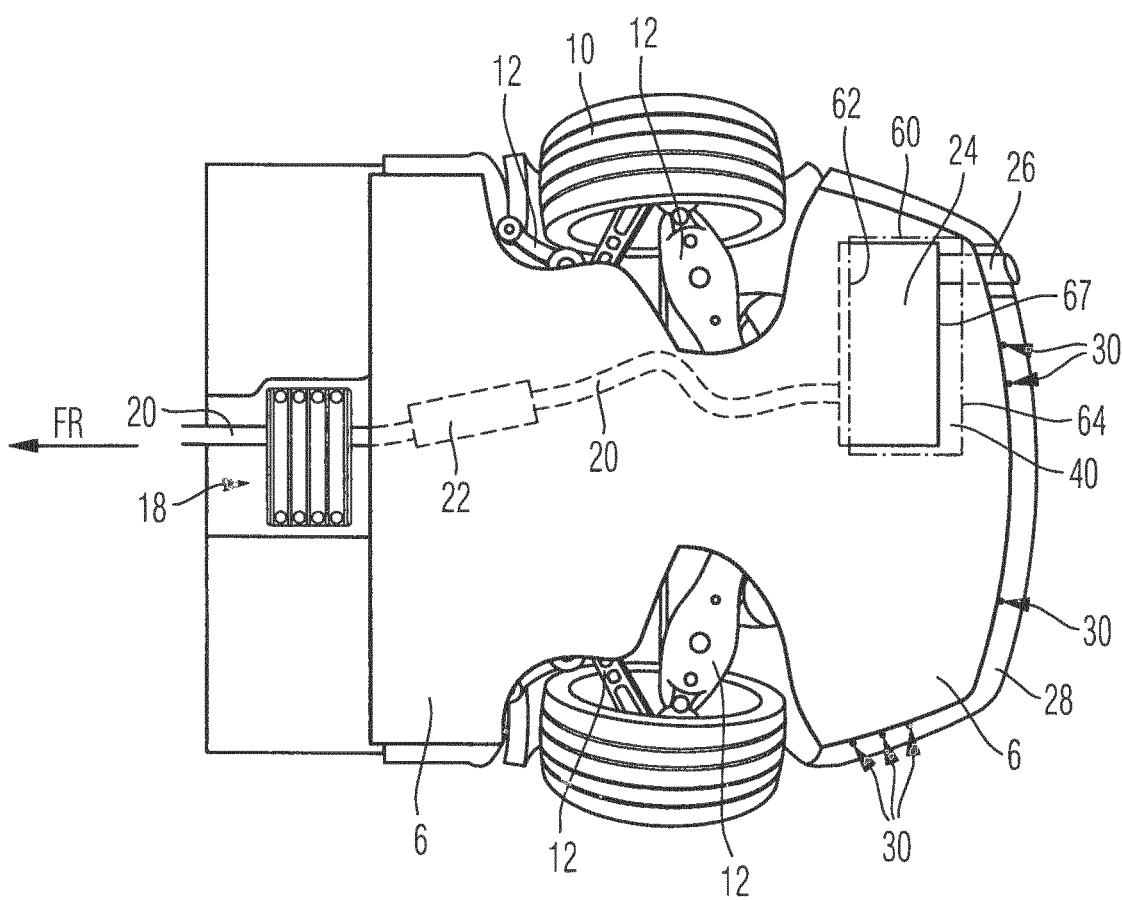
FIG. 4 is a view from below of the rear-end region of the motor vehicle.

A motor vehicle which is designated as a whole by 2, and of which only the rear section is illustrated, has a floor panel 4 and, spaced apart from the latter, an underbody trim 6 which faces toward the roadway 7. The rear axle of the motor vehicle 2 is designated generally by arrows 8. FIG. 4 shows the rear axle with rear wheels 10 and wheel control members 12. In front of the rear axle 8, a fuel tank 16 is arranged in the intermediate space 14 between the floor panel 4 and the underbody trim 6. Furthermore, an exhaust line 20 with a pre-muffler 22 is accommodated in a central tunnel 18 (see FIG. 4). The exhaust line 20 leads to a rear exhaust muffler 24 with a tailpipe 26 arranged in the transverse direction of the motor vehicle 2. At the rear-end side, the underbody trim 6 is adjoined by a trim 28 of a rear bumper. The connection between the underbody trim 6 and trim 28 is realized by means of a multiplicity of connecting elements 30.

The underbody trim 6 is made up of a front and a rear section 32 and 34 respectively. The front section 32 conceals, in the downward direction, the region of the fuel tank 16 and the region of the rear axle 8. The rear section 34 conceals the region below a luggage compartment 35. The rear exhaust muffler 24 is arranged in this region. The front and rear sections 32 and 34 are—different from to the diagrammatic illustration in FIGS. 1 and 3—connected to one another without a gap, resulting overall in a high stiffness of the underbody trim 6. The rear section 34 rises rearward, counter to the direction of travel FR.

An air inlet 40 is provided in the underbody trim 6 in the region of the rear end of the rear exhaust muffler 24. The air inlet 40 is of gap-like form and has approximately the same width extent as the rear exhaust muffler 24. The air inlet 40 is designed differently depending on the height extent of the rear exhaust muffler 24.

Figure 1:
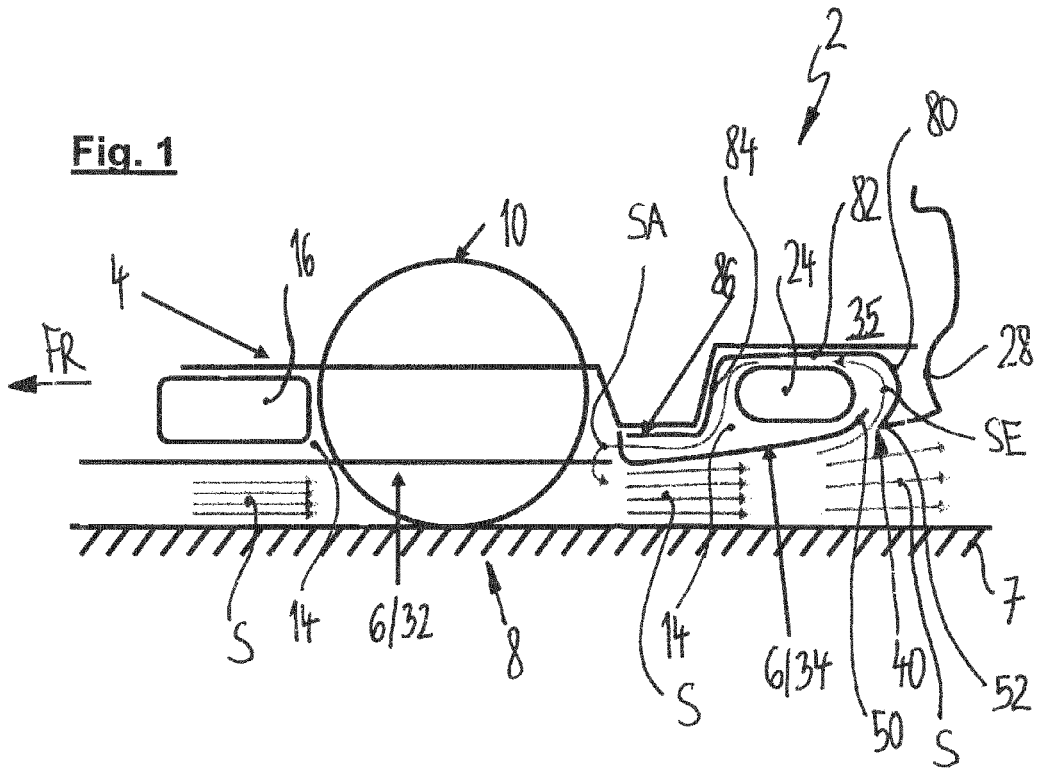
FIG. 1 is a schematic longitudinal section view through the rear-end region of a motor vehicle according to an embodiment of the invention.

In a first exemplary embodiment of the invention as per FIG. 1, in the case of a rear exhaust muffler 24 having a small structural height, the air inlet 40 is formed exclusively by a cutout in the underbody trim 6. The cutout in the underbody trim 6 has a front and a rear edge 50 and 52 respectively. The front edge 50 is angled inward at a small acute angle with respect to the underbody trim 6. Owing to this indentation, a streamlined ramp is provided at the front edge 50 of the air inlet 40.

Figure 3:
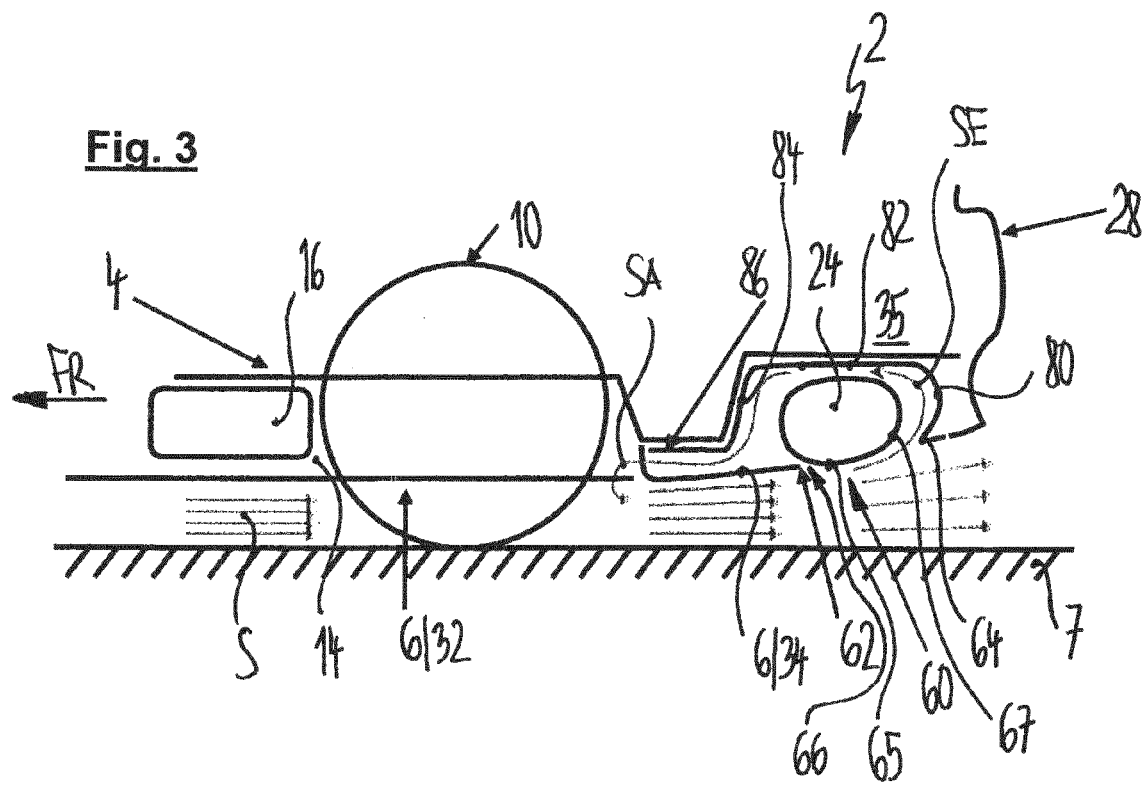
FIG. 3 is a second exemplary embodiment of the invention in an illustration corresponding to FIG. 1.

In the second exemplary embodiment of the invention as per FIG. 3, in the case of a rear exhaust muffler 24 having a relatively large structural height, the air inlet 40 is formed by the interaction of rear exhaust muffler 24 and underbody trim 6. For this purpose, a relatively large cutout 60 is provided in the underbody trim 6, which cutout is illustrated in FIG. 4 by dash-dotted lines. The front and rear edges of the cutouts 60 are designated by 62 and 64 respectively. The rear exhaust muffler 24 protrudes with its underside 65 beyond or flush with the contour of the underbody trim 6 in the region of the cutout 60. The front edge 62 of the cutout 60 extends to a point very close to the rear exhaust muffler 24, such that a streamlined transition with a small gap dimension 66 is formed. The rear side 67 of the rear exhaust muffler 24 forms the air inlet 40 together with the rear edge 64 of the cutout 60. Owing to the rounding of the rear side 67 of the rear exhaust muffler 24, a streamlined ramp for the inflowing air is provided here too. The underside 65 of the rear muffler 24 itself forms a part of the surface along which the underbody flow passes while the motor vehicle 2 is traveling.

The flow conditions while the motor vehicle is traveling are illustrated in FIGS. 1 and 3 by flow arrows S. While the motor vehicle 2 is traveling, a uniformly directed flow is generated between the underbody trim 6 and the roadway 7 in the region in front of the rear axle 8, this being symbolized by flow arrows S running parallel to one another. Immediately behind the rear axle 8, the flow cross section widens owing to the underbody trim 6, which is of diffuser-like form, in the rear-end region of the motor vehicle 2.

Figure 2:
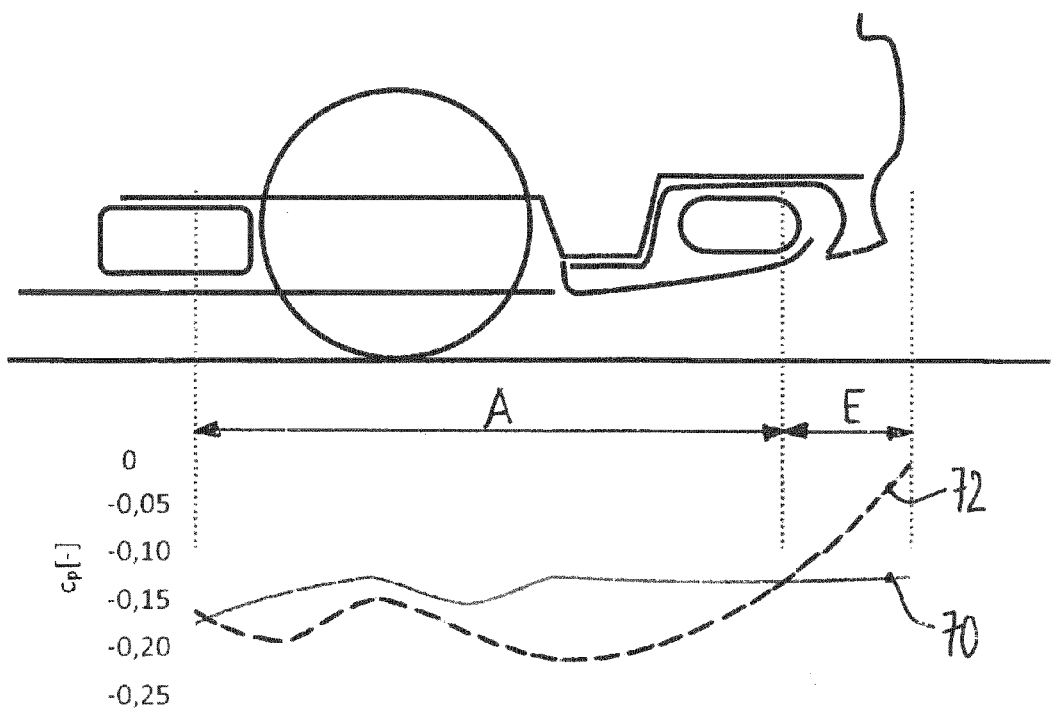
FIG. 2 is an illustration corresponding to FIG. 1, additionally with a diagram illustrating the pressure conditions.

The pressure conditions generated while the motor vehicle 2 is traveling, both in the intermediate space 14 between the floor panel 4 and underbody trim 6 and at the underside of the underbody trim 6, are illustrated in FIG. 2 in a diagram. Here, the pressure profile in the intermediate space 14 is depicted by a solid line 70 and the pressure profile at the underside of the underbody trim 6 is depicted by a dashed line 72. The pressure profiles 70 and 72 are plotted as a standardized pressure coefficient $c_p$ and indicate the profile of the negative pressure in the longitudinal direction of the motor vehicle 2. The numerical values for the pressure coefficients $c_p$ should be regarded merely as being exemplary.

The negative pressure in the intermediate space 14 (pressure profile line 70) is approximately constant over the longitudinal extent of the rear-end region of the motor vehicle 2. By contrast, the negative pressure at the underbody trim 6 (pressure profile line 72) is at an approximately constant level in the front section of the rear-end region and subsequently decreases in the rearward direction owing to the diffuser action of the underbody trim 6. Here, from the region of the rear axle 8 to the region of the rear muffler 24, the negative pressure in the intermediate space 14 is of lesser magnitude than the negative pressure at the underside of the underbody trim 6. In the rear region of the rear exhaust muffler 24, the rising pressure profile line 72 intersects the pressure profile line 70. The diagram of FIG. 2 is thus divided into a front section A and a rear section E. In section A, the pressure conditions at the underside of the motor vehicle 2 have the effect basically that air can flow out of the intermediate space 14 in the direction of the roadway 7, whereas, in the region E, owing to the reversed pressure conditions, air from the flow around the motor vehicle 2 can flow, with low flow losses, into the intermediate space 14.

The air that flows in in region E, as denoted by flow arrows SE, is conducted around the rear exhaust muffler 24 by an air-guiding panel 80 and by a heat shield panel 82 running parallel to the floor panel 4. In this way, as per the flow arrows SE, the flow is diverted through 180° in relation to the underbody flow S and is guided "back" to the front region of the rear exhaust muffler 24. There, the flow is diverted downward along an approximately vertically oriented air-guiding panel 84. The air subsequently flows further in the direction of travel FR along a heat shield panel 86 to the transition between the front and rear sections 32 and 34 of the underbody trim 6. The air flowing around emerges, as indicated by the flow arrows SA, in the region of the transition between the sections 32 and 34 of the underbody trim 6 via underbody regions that are not concealed by the underbody trim 6 (see FIG. 4), preferably via lateral regions of the underbody trim 6, in which free spaces for wheel control elements 12 of the rear axle 8 of the motor vehicle 2 are provided. The wheel control links 12 are, for example, transverse links, which require a correspondingly large amount of freedom of movement in the vertical direction of the motor vehicle 2. Since, in the transition region between the sections 32 and 34 of the underbody trim 6, a negative pressure of lesser magnitude prevails in the intermediate space 14 than at the underside of the underbody trim 6, the air flows out of the intermediate space 14 of its own accord, with low flow losses, as per the flow arrows SA. The emerging air mixes, at the underside of the underbody trim 6, with the underbody flow S that flows past at a considerably greater speed.

The invention can be summarized as follows. An underbody trim 6 for the rear-end region of a motor vehicle 2 conceals a rear exhaust muffler 24. For the purposes of cooling the rear exhaust muffler 24, an air inlet 40 is provided in the underbody trim 6. According to the invention, the air inlet 40 is arranged in a region in which, while the motor vehicle 2 is traveling, a pressure is higher at the underside of the underbody trim 6 than the region of the floor panel 4 arranged thereabove. It is thus possible for cooling ambient air to be conducted into the region of the rear exhaust muffler 24 with low flow losses.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A motor vehicle equipped with a rear exhaust muffler, comprising:
    a floor panel of the motor vehicle;
    an underbody trim in a rear-end region of the motor vehicle, wherein the underbody trim is arranged below the floor panel and at least partially conceals the rear exhaust muffler; and
    a fixed-open air inlet in the underbody trim, wherein
        the fixed-open air inlet is arranged in a region in which, while the motor vehicle is traveling, a pressure is higher at an underside of the underbody trim than in an intermediate space between the underbody trim and the floor panel, whereby air flows through the fixed-open air inlet while the motor vehicle is traveling.

2. The motor vehicle according to claim 1,
    wherein the underbody trim is formed as a diffuser.

3. The motor vehicle according to claim 2,
    wherein the rear exhaust muffler is completely concealed by the underbody trim.

4. The motor vehicle according to claim 1,
    wherein the rear exhaust muffler is completely concealed by the underbody trim.

5. The motor vehicle according to claim 1,
    wherein the underbody trim has a cutout for an underside of the rear exhaust muffler, and at least one surface of the rear exhaust muffler itself forms a boundary of the fixed-open air inlet.

6. The motor vehicle according to claim 1,
    wherein the rear exhaust muffler is arranged approximately transversely with respect to the direction of travel of the motor vehicle.

7. The motor vehicle according to claim 1,
    wherein the fixed-open air inlet is situated behind the rear exhaust muffler.

8. The motor vehicle according to claim 1,
    wherein, in the intermediate space between the floor panel and the underbody trim, at least one air-guiding panel is provided to guide the air around the rear exhaust muffler.

9. The motor vehicle according to claim 8,
    wherein, in the intermediate space between the floor panel and the underbody trim, at least one heat shield panel is provided which interacts with the air-guiding panel.

10. The motor vehicle according to claim 1,
    wherein the underbody trim begins after a rear axle of the motor vehicle and extends as far as a trim of a rear bumper of the motor vehicle.

11. The motor vehicle according to claim 1,
    wherein the underbody trim begins in front of a rear axle of the motor vehicle and extends as far as a trim of a rear bumper of the motor vehicle.

* * * * *